(12) United States Patent
Köstler et al.

(10) Patent No.: US 8,999,207 B2
(45) Date of Patent: Apr. 7, 2015

(54) METALLICALLY CONDUCTIVE INK FOR INK-JET PRINTING AND METHOD FOR PRODUCING THE SAME

(75) Inventors: Stefan Köstler, Graz (AT); Daniela Wachter, Graz (AT); Heinz Pichler, Graz (AT); Andreas Rudorfer, Graz (AT)

(73) Assignee: Joanneum Research Forschungsgesellschaft mbH, Graz (AT)

( * ) Notice: Subject to any disclaimer, the term of this patent is extended or adjusted under 35 U.S.C. 154(b) by 406 days.

(21) Appl. No.: 13/515,937

(22) PCT Filed: Dec. 13, 2010

(86) PCT No.: PCT/AT2010/000477
§ 371 (c)(1),
(2), (4) Date: Jun. 14, 2012

(87) PCT Pub. No.: WO2011/079329
PCT Pub. Date: Jul. 7, 2011

(65) Prior Publication Data
US 2012/0256142 A1    Oct. 11, 2012

(30) Foreign Application Priority Data

Dec. 16, 2009 (AT) ................. A 1995/2009

(51) Int. Cl.
C09D 11/36  (2014.01)
C09D 7/12   (2006.01)
C09D 11/52  (2014.01)

(52) U.S. Cl.
CPC .............. *C09D 11/36* (2013.01); *C09D 7/1266* (2013.01); *C09D 7/1275* (2013.01); *C09D 11/52* (2013.01); *Y10S 977/773* (2013.01)

(58) Field of Classification Search
None
See application file for complete search history.

(56) References Cited

U.S. PATENT DOCUMENTS

| 2004/0051083 A1* | 3/2004 | McDonald et al. ........... 252/500 |
| 2006/0130700 A1 | 6/2006 | Reinartz |
| 2007/0056402 A1 | 3/2007 | Cho |
| 2007/0154644 A1 | 7/2007 | Hwang |
| 2008/0008822 A1 | 1/2008 | Kowalski |

FOREIGN PATENT DOCUMENTS

WO    2006/093398    9/2006

* cited by examiner

*Primary Examiner* — Harold Pyon
*Assistant Examiner* — Jaison Thomas
(74) *Attorney, Agent, or Firm* — Jacobson Holman, PLLC

(57) ABSTRACT

The invention relates to a metallic, conductive ink for ink-jet printing, comprising a metal precursor material, in particular an organometallic decomposition compound, and a thermally decomposable polymer dissolved in an organic solvent, wherein a polymer having a decomposition temperature $T_c < 150°$ C. is contained as the thermally decomposable polymer. The polymer is selected from a cyclic polyacetal having blocked terminal groups, a cyclic polyaldehyde comprising bifunctional monomers, such as polyphthalaldehyde, polyglutaraldehyde, polysuccinaldehyde, and a polymeric glyoxylic acid, or a glyoxylic acid derivative, such as poly(methyl glyoxylate). The monomeric depolymerization products of the thermally decomposable polymer are used as reductants for the metal precursor material. The invention further relates to a method for producing the ink.

20 Claims, No Drawings

METALLICALLY CONDUCTIVE INK FOR INK-JET PRINTING AND METHOD FOR PRODUCING THE SAME

This is a national stage of PCT/AT10/000477 filed Dec. 13, 2010 and published in German, which claims the priority of Austria number A 1995/2009 filed Dec. 16, 2009, hereby incorporated by reference.

The present invention relates to a metallic conductive ink for ink-jet printing, comprising a metal precursor material, in particular an organometallic decomposition compound, and a thermally decomposable polymer dissolved in an organic solvent. The invention further relates to a method for producing a metallically conductive ink for ink-jet printing, comprising dissolving a metal precursor material and adding a thermally decomposable polymer dissolved in an organic solvent.

Metallically conductive inks for printing electrically conductive patterns have been known for quite some time and are usually based on concentrated dispersions of metallic particles in aqueous or organic solvents or carriers, to which further additives are admixed for stabilizing and adjusting the surface tension and the rheological properties. In order to be suitable for ink-jet printing, such metallically conductive ink particles have to have dimensions of a few nanometers up to 100 nm, ink-jet inks based on highly concentrated metallic nanoparticle dispersion, however, involving the drawback that the effective stabilization of highly concentrated nanoparticle dispersions by surface-active substances and polymers is very difficult. It is, moreover, almost impossible to avoid the agglomeration of the metallic particles over an extended period of time, so that such inks will tend to agglutinate or clog nozzles and print heads, thus clearly reducing the service lives of both the ink and the devices operated therewith.

In order to avoid such problems of ink formulations based on metallic nanoparticles, WO 2006/093398 proposed an ink formulation based on metal complexes or a metal salts. Due to the low molecular weight of the soluble metal complexes employed, those inks involve drawbacks, in particular in printing applications, since their viscosities are too low to be usable in conventional ink-jet printing technologies. To solve this problem, it was proposed to supplement such ink formulations with polymers as viscosity modifiers, said polymers having been decomposed during a drying and/or hardening step following printing. An ink of this type is, for instance, described in US-A 2007/0154644.

The film-forming properties and pattern-forming properties of solutions containing metallic compounds having low-molecular weights and metal salts are still poor, requiring the addition of a binder, in particular a polymer having a high molecular weight for film formation to form films or patterns. In order to reduce the metal complexes used in such inks after the printing step, a thermolytic process of the metallic precursor, or the addition of a chemical reductant to be contacted with the metal precursor, is required. This is, for instance, realized according to US-A 2006/0130700 by a second printing process, in which the reductant is separated.

The present invention aims to provide a metallically conductive ink for ink-jet printing, whose composition is selected such that it is directly suitable for printing on various substrate materials by ink-jet printing technologies, and which is suitable for printing without using additives such as viscosity modifiers, catalysts, reductants and the like, forming a homogenous metallic pattern displaying an excellent conductivity immediately after printing and drying.

To solve this object, the ink according to the invention is characterized in that a polymer having a decomposition temperature $T_c < 150°$ C. is contained as the thermally decomposable polymer, the polymer is selected from a cyclic polyacetal having blocked terminal groups, a cyclic polyaldehyde comprising bifunctional monomers, such as polyphthalaldehyde, poly-glutaraldehyde, polysuccinaldehyde, and a polymeric glyoxylic acid or a glyoxylic acid derivative, such as poly(methyl glyoxylate), and monomeric depolymerization products of the thermally decomposable polymer are used as reductants for the metal precursor material. In that a polymer having a decomposition temperature smaller than 150° C. is contained as thermally decomposable polymer in the metallically conductive ink for ink-jet printing according to the present invention, it will be ensured that the thermally decomposable polymer will decompose after printing during a baking step at a maximum of 150° C. A sintering step at high temperatures larger than 200° C., as will usually be required above all with metals having high melting points like Pt, can thus be avoided. In that the polymer is, moreover, selected from a cyclic polyacetal having blocked terminal groups, a cyclic polyaldehyde comprising bifunctional monomers, such as polyphthalaldehyde, polyglutaraldehyde, poly-succinaldehyde, and a polymeric glyoxylic acid, or a glyoxylic acid derivative, such as poly(methyl glyoxylate), it has become possible to provide the thermally extremely sensitive cyclic polyacetals, cyclic polyaldehydes comprising bifunctional monomers in an isolatable and/or technologically exploitable form so as to be directly usable in the metallically conductive ink for ink-jet printing without any further processing. In that monomeric depolymerization products of the thermally decomposable polymer are, moreover, usable as reductants for the metal precursor material, it has become possible to provide a metallically conductive ink which, during its use, i.e. during printing and subsequent drying, will be chemically changed in such a manner that the polymer will, on the one hand, decompose and the formed decomposition components of the polymer will, on the other hand, immediately reduce the metal precursor material, so that, after having completed the printing and drying operation, a metallically conductive pattern that is both homogenous and well conductive will be provided on the substrate. In a preferred manner, the thermally decomposable polymers are selected from the class of cyclic polyacetals and poly(glyoxylic acid derivatives) having the general formula:

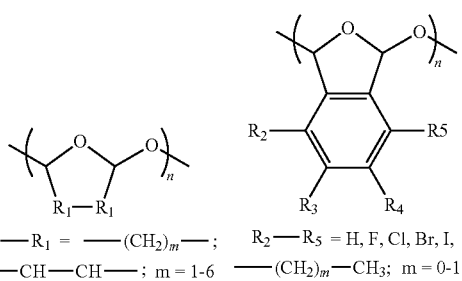

-continued

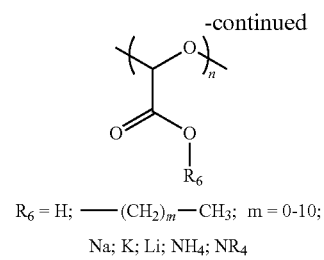

R_6 = H;  ——(CH$_2$)$_m$—CH$_3$;  m = 0-10;

Na; K; Li; NH$_4$; NR$_4$ all of which have especially favourable decomposition properties.

In that the thermally decomposable polymer is selected from the group consisting of cyclic polyacetals, cyclic polyaldehydes comprising bifunctional monomers, such as polyphthalaldehyde, polyglutaraldehyde, polysuccinaldehyde, and polymeric glyoxylic acid derivatives, such as poly (methyl glyoxylate), it has, furthermore, become possible to provide a conductive ink that does not agglomerate or agglutinate, can be rapidly and reliably printed and, due to the rapid decomposition of the selected polymer, particularly at low temperatures, will moreover form an extremely well conductive and homogenous print during drying occurring immediately after printing.

In order to safely prevent the thermally decomposable polymer from prematurely decomposing, the metallically conductive ink according to the present invention is preferably further developed such that the terminal groups of the thermally decomposable polymer are blocked by stable groups such as ethers, esters, amides or urethanes. In that the terminal groups of the thermally decomposable polymer according to the present invention are blocked by stable groups such as ethers, esters, amides or urethanes, the unstable, thermally decomposable polymers can be provided in technologically exploitable form so as to be immediately usable in a metallically conductive ink, additionally enabling the formation of an ink that is stable over extended storage times or times of use and will not show any decomposition or separation of metallic particles.

In that, as in correspondence with a preferred further development of the present invention, the metal precursor material of the metallically conductive ink is selected to be a metal complex, or a metal salt, whose central metal atom is selected from the group consisting of Ag, Au, Cu, Zn, Ni, Co, Pd, Pt, Ti, Zr, Cr, Ru, Os, Ir, Sn, Pb, Al, Mo, W, and comprises one or more ligand(s) or counterion(s) selected from the group consisting of H, OH, halogen, ammonium, alkyl ammonium, amine, amide, carboxylate, carbonate, acetyl acetonate, cyanide, cyanate, isocyanate, thiocyanate, isothiocyanate, phosphate, phosphine, alkoxide, alcohol, thiolate, thiol, nitrate, nitrite, azide, terafluoroborate, chlorate, perchlorate and carbonyl, such as, e.g., H$_2$PtCl$_6$, K$_2$PtCl$_4$, Pt(acac)$_2$, PtCl$_2$, PtCl$_4$, (NH$_4$)$_2$PdCl$_4$, (NH$_4$)$_2$PdCl$_6$, Pd(acac)$_2$, Pd(C$_n$H$_{2n+1}$COO)$_2$ (n-1-20), HAuCl$_4$, (NH$_4$)AuCl$_4$, Au(C$_n$H$_{2n-1}$COO)$_2$ (n-1-20), Ag(CH$_3$(CH$_2$)$_n$COO) wherein n=4-25, AgNO$_3$, CuSO$_4$, RuCl$_3$, Ru(acac)$_3$, SnCl$_2$, ZnCl$_2$ or Zn(NO$_3$)$_2$, it has, in particular, become possible to use simple and readily producible metal complexes or metal salts as metal precursor material in the ink such that, on the one hand, a massive cost reduction of the product according to the present invention will be achieved and, on the other hand, the metallically conductive ink will safely and reliably show a good conductivity and homogeneity of the print immediately after having been printed on the desired substrate and dried.

In that the metallically conductive ink according to a preferred further development of the present invention is configured such that a phase transfer reagent is additionally contained, which is selected from the group of R—NH$_2$, wherein R is either an aromatic hydrocarbon or an alkyl having 4 to 20 carbon atoms, R$_4$N$^+$A$^-$, wherein R represents hydrogen, alkyl having 1 to 20 carbon atoms or aromatic hydrocarbons and A$^-$ is halogen, OH or OAc, R—COO$^-$Kat$^+$, wherein R is either an aromatic hydrocarbon or an alkyl having 4 to 20 carbon atoms and Kat$^+$ represents H, NH$_4$, NR$_4$, K, Na or Li, R—SO$_3^-$Kat$^+$, wherein R is either an aromatic hydrocarbon or an alkyl having 4 to 20 carbon atoms and Kat$^+$ represents H, NH$_4$, NR$_4$, K, Na or Li, and R$_3$PO, wherein R is an alkyl having 4 to 20 carbon atoms, it has become possible in a particularly rapid and reliable manner to extract a complex metal anion into the organic phase from, for instance, aqueous solutions of inorganic metal complexes, and hence provide a metallically conductive ink comprising, in addition to the rheological properties required for printing, such as the viscosity, also a high concentration of metal ions in the ink, so as to provide a print having sufficient conductivity. Such an ink, moreover, will not clog or contaminate the printing nozzle used for printing, thus resulting in a considerable overall economic advantage.

In order to, in particular, enable uniform and streak-free printing using the ink according to the present invention, the latter is preferably further developed to the effect that at least one solvent selected from dimethyl sulfoxide, gamma-butyrolactone 1,2-dimethoxybenzene, tetrahydrofuran, dioxane, cyclopentanone, alkyl acetate, alkyl propionate, alkyl butyrate, toluene, xylene, butanone, anisole or dichloromethane is contained.

In order to, in particular, safely prevent the ink from running or blurring during printing or after printing, the ink according to the invention is preferably further developed such that the ink has a viscosity of 1.5 to 35 mPa, in particular, 2.5 to 12 mPa. On the one hand, such a viscosity provides a uniform print that will not run out and, on the other hand, the viscosity of the ink is low enough to prevent clogging of the nozzles of a printer.

In order to ensure particularly uniform printing and, in particular, a sufficient electrical conductivity of the formed print, the ink according to a preferred further development is devised such that it comprises a metal portion of >5% by weight, in particular >8% by weight. Such a high metal content in the ink will safely prevent an inhomogenous, streaky print. A continuous and uniform printed layer showing good conductivity will rather be provided.

In order to ensure homogenous printing and, in particular, a uniform distribution of the metal particles in the ink, the metallically conductive ink according to a preferred further development is devised such that it contains surface-active substances such as surfactants, block copolymers, wetting agents or emulsifiers. By surface-active substances such as surfactants, block copolymers, wetting agents or emulsifiers being contained in the metallically conductive ink, the surface tension and the wetting properties will be adapted to the substrate material so as to achieve further homogenization of the print.

In order to further increase the metal content and, in particular, fill up with metallic particles possibly present gaps in the ink formulation, the invention is preferably further developed to the effect that metallic nanoparticles having dimensions of 3 to 200 nm, in particular 5 to 60 nm, are additionally contained, thus also drastically further improving its conductivity.

Particularly complete filling up of the gaps present in the ink formulation, and hence an almost completely homogenous ink, is preferably further provided in that 1 to 20% by weight, in particular 5 to 10% by weight, of the metal portion of the ink is comprised of metallic nanoparticles.

The invention further aims to provide a simplified method for producing a metallically conductive ink for ink-jet printing, which is stable over a long time.

To solve this object, the method according to the invention is characterized in that a solution of the metal precursor material, in particular a metal complex, is supplemented with a thermally decomposable polymer dissolved in an organic solvent and having a decomposition temperature $T_c$<150° C., which polymer is selected from a cyclic polyacetal having blocked terminal groups, a cyclic polyaldehyde comprising bifunctional monomers, such as polyphthalaldehyde, polyglutaraldehyde, polysuccinaldehyde, and a polymeric glyoxylic acid or a glyoxylic acid derivative, such as poly(methyl glyoxylate), and that the metal precursor material is reduced by monomeric depolymerization products of the thermally decomposable polymer. By conducting the method in such a manner that a solution of the metal precursor material is supplemented with a thermally decomposable polymer dissolved in an organic solvent, it has become possible to produce an electrically conductive printing ink that is stable over a long time and which does not require any further additives for stabilization, viscosity adjustment or the like. The method can also be conducted in such a manner that the two starting solutions are stored separately and reacted with each other immediately before use so as to safely prevent a premature degradation or premature reduction of the metal complex. In that the method is conducted in such a manner, it has become possible to not only provide an ink having an optimally adjusted viscosity, but also avoid the addition of thermal catalysts, reductants or the like, thus simplifying the overall method control. By conducting the method in such a manner that the thermally decomposable polymer is decomposed into reducing monomeric components at an extremely low decomposition temperature ($T_c$) and, in particular, at a temperature below the temperature of the curing step, or even below room temperature, so as to enable, by the method according to the present invention, the direct reduction of the metal precursor material into the neutral metal, thus avoiding the use of an additional reductant or the exposure of the pressure to a reducing gas atmosphere and, furthermore, the realization of the curing of the formed printed pattern at temperatures <200° C.

In order to, in particular, conduct the method in a rapid and reliable manner, the method according to a preferred further development is devised such that an aqueous solution of the metal precursor material is supplemented with a phase transfer reagent dissolved in an organic solvent, is stirred, and a formed organic phase, after having been separated from the aqueous phase, is added to the solution of the decomposable polymer. On the one hand, such a method control enables the use of particularly cost-effective, water-soluble metal precursor materials or metal complexes in the method according to the invention and, on the other hand, the use of a phase transfer reagent causes the extraction of an ionic metal complex or an ionic metal salt from an aqueous inorganic solution into an organic solvent by forming an ion pair with a hydrophobic counterion, whereby high metal concentrations will, in particular, be achievable in the solution.

Such a method control further enables the metal precursor material to enter into solution and to be subsequently transformed into the neutral metallic form by a chemical reduction process using the monomeric depolymerization products of the thermally decomposable polymer, and to be applied on the surface to be printed. Such a reduction process can be effected either directly during printing or immediately after printing onto the substrate as a function of the purpose of use and the accordingly required temperature.

In order to safely avoid undesired byproducts in the organic solution containing the metal precursor material, the method according to the invention is preferably conducted in such a manner that the formed organic phase containing the metal precursor material is evaporated and a residue containing the metal precursor material is taken up in an organic solvent. Such a mode of procedure enables the safe and reliable separation of the metal precursor material components that are not required for printing, so that an ink enabling a clean print free of streaks and interruptions will altogether be producible.

The method according to the present invention in a particularly efficient and reliable manner can be performed such that as the metal precursor material a metal complex or a metal salt is preferably used, whose central metal atom is selected from the group consisting of Ag, Au, Cu, Zn, Ni, Co, Pd, Pt, Ti, Zr, Cr, Ru, Os, Ir, Sn, Pb, Al, Mo, W, and comprises one or more ligand(s) or counterion(s) selected from the group consisting of H, OH, halogen, ammonium, alkyl ammonium, amine, amide, carboxylate, carbonate, acetyl acetonate, cyanide, cyanate, isocyanate, thiocyanate, isothiocyanate, phosphate, phosphine, alkoxide, alcohol, thiolate, thiol, nitrate, nitrite, azide, terafluoroborate, chlorate, perchlorate and carbonyl, such as, e.g., $H_2PtCl_6$, $K_2PtCl_4$, Pt (acac)$_2$, $PtCl_2$, $PtCl_4$, $(NH_4)_2PdCl_4$ $(NH_4)_2PdCl_6$, Pd(acac)$_2$, Pd $(C_nH_{2n+1}COO)_2$ (n-1-20), $HAuCl_4$, $(NH_4)$ $AuCl_4$, Au $(C_nH_{2n-1}COO)_2$ (n-1-20), $Ag(CH_3(CH_2)_nCOO)$ wherein n=4-25, $AgNO_3$, $CuSO_4$, $RuCl_3$, Ru(acac)$_3$, $SnCl_2$, $ZnCl_2$ or $Zn(NO_3)_2$.

By using as the metal precursor material a metal complex, or a metal salt, whose central metal atom and whose ligands or counterions are selected according to the invention, it has become possible to produce an ink formulation that can be printed with a conventional piezoelectric ink-jet printing device and which is able to form well-defined and electrically conductive metallic patterns.

In that, as in correspondence with a preferred further development of the present invention, the method is conducted in such a manner that the phase transfer reagent is selected from the group of R—$NH_2$, wherein R is either an aromatic hydrocarbon or an alkyl having 4 to 20 carbon atoms, $R_4N^+A^-$, wherein R represents hydrogen, alkyl having 1 to 20 carbon atoms or aromatic hydrocarbons and $A^-$ is halogen, OH or OAc, R—$COO^-Kat^+$, wherein R is either an aromatic hydrocarbon or an alkyl having 4 to 20 carbon atoms and $Kat^+$ represents H, $NH_4$, $NR_4$, K, Na or Li, R—$SO_3^-Kat^+$, wherein R is either an aromatic hydrocarbon or an alkyl having 4 to 20 carbon atoms and $Kat^+$ represents H, $NH_4$, $NR_4$, K, Na or Li, and $R_3PO$, wherein R is an alkyl having 4 to 20 carbon atoms, a further acceleration of the method will be achieved and a product will, at the same time, be formed by said method, which product enables the safe and reliable printing of well-defined, metallically conductive patterns.

In the following, the invention will be explained in more detail by way of exemplary embodiments.

EXAMPLE 1

Preparation of a Gold Ink Formulation 390 mg $HAuCl_4$ is dissolved in water to produce a 0.1-molar solution. This solution is supplemented with a solution of 1.1 g tetraoctylammonium bromide in 10 ml dichloromethane, and the two phases are mixed under vigorous stirring. The use of the phase transfer reagent, i.e. tetraoctylammonium bromide, and vigorous stirring result in the formation of an ion pair between the tetrachloroaurate anion and the tetraoctylammonium cation, and in the extraction of the ion pair into the organic phase according to the following reaction equation:

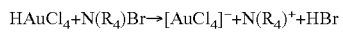

$$HAuCl_4 + N(R_4)Br \rightarrow [AuCl_4]^- + N(R_4)^+ + HBr$$

The organic phase is separated, washed twice with the aqueous sodium carbonate solution, and the solvent, dichloromethane, is evaporated by passing a nitrogen flow through the solution. The remaining gold complex is dissolved in 2 ml gamma-butyrolactone. After this, 2 ml of an 0.5-molar solution of poly-(phthalaldehyde) with a molecular weight of 40,000 to 50,000 Dalton, dissolved in gamma-butyrolactone, is added to the organic solution of the gold complex to produce a gold ink formulation ready for printing.

In this ink formulation, the thermally depolymerizable polymer serves both as a viscosity modifier, with the viscosity of the ink having been adjusted to 7 mPa, and as a reductant.

The thus prepared printing ink was filled into a printer cartridge of a Diamatix DMP printer for printing electrically conductive patterns.

By applying a piezoelectric voltage to the print head and discharging about 10 pl ink droplets, a pattern was printed on a flexible polymer film. After having completed the printing process, the polymer film substrate with the imprinted pattern was dried in an oven at 190° C. for 2.5 hours and subsequently checked for its electric conductivity, completeness of the transformation into the metallic state and uniformity of the print. By the decomposition of the depolymerizable polymer and by the reduction using the monomeric depolymerization products, 98% of the metal ions had been transformed into the metallic state during drying. The printed pattern was completely uniform, showed no streaks and no interruptions whatsoever, wherein the specific resistance of the printed structure was determined to be about $10^{-7}$ Ωm.

EXAMPLE 2

Preparation of a Platinum Ink Formulation 410 mg hexachloroplatinic acid ($H_2PtCl_6$) is dissolved in water to produce a 0.1-molar solution. A solution of 1.1.g tetraoctyl-ammonium bromide, which serves as a phase transfer reagent, in 10 ml dichloromethane is admixed to the aqueous phase, and the two phases are mixed by vigorous stirring. In doing so, an ion pair is formed between the tetrachloroplatinate anion and the tetraoctylammonium cation, said ion pair being extracted into the organic phase according to the following reaction equation:

$$H_2PtCl_6 + N(R_4)Br \rightarrow [PtCl_6]^{2-} + 2N(R_4)^+ + 2HBr$$

The organic phase is separated, washed twice with an aqueous sodium carbonate solution, the organic solvent is evaporated by passing a nitrogen flow through the solution, and the formed platinum complex is dissolved in 2 ml gamma-butyrolactone. After having added 2 ml of an 0.5-molar solution of poly-(phthalaldehyde) with a molecular weight of about 45,000 Dalton, an ink ready for printing was obtained.

This ink was used for a printing test analogous to Example 1, wherein it could be observed that the print was completely uniform, 990 of the metal ions had been transformed into the metallic state, and the formed printing pattern had a specific resistance of about $10^{-6}$ Ωm.

EXAMPLE 3

Preparation of a Silver Ink Formulation 3 g silver nitrate ($AgNO_3$) is directly added to 5 ml of a 1-molar solution of poly(phthalaldehyde) with a molecular weight of about 45,000 Dalton in DMSO under stirring without requiring an extraction from an aqueous solution and a phase transfer reagent, whereby an ink ready for printing is obtained and a viscosity of about 6 mPa is adjusted.

This ink was used for a printing test analogous to Example 1, wherein it could be observed that the print was uniform, 98% of the metal ions had been transformed into the metallic state, and the formed printing pattern had a specific resistance of about $10^{-7}$ Ωm.

After curing, all of the produced printing inks showed excellent conductivities, low specific resistances, and the metallic anions had each been converted into the metallic (zero-valent) state by at least 95%.

EXAMPLE 4

Preparation of a Platinum Ink Formulation 700 mg $K_2PtCl_4$ is dissolved in water to obtain a 0.1-molar solution. To this solution is added a 0.2M solution of tetraoctylammonium bromide in 10 ml ethyl acetate, and the two phases were mixed under vigorous stirring. The tetrachloroplatinate anion is thereby extracted as an ion pair into the organic phase according to the following reaction equation:

$$K_2PtCl_4 + 2NR_4Br \rightarrow [PtCl_4]^{2-} + 2[NR_4]^- + 2KBr$$

The organic phase is separated, washed twice with an aqueous sodium carbonate solution, the organic solvent is stripped under vacuum, and the remaining platinum complex is dissolved in 2 ml gamma-butyrolactone. After having added a solution of 160 mg poly(ethyl glyoxylate) (MW about 40,000 Dalton) in 2 ml gamma-butyrolactone, an ink ready for printing and having a viscosity of about 6 mPa is obtained.

This ink was used for a printing test analogous to Example 1, wherein it could be observed that the print was uniform, 98% of the metal ions had been transformed into the metallic state, and the formed printing pattern had a specific resistance of about $10^{-6}$ Ωm.

EXAMPLE 5

Preparation of a Gold Ink Formulation 900 mg gold(III) acetate, $Au(CH_3COO)_3$, is directly dissolved in 5 ml gamma-butyrolactone under stirring without requiring an extraction from an aqueous solution, in order to obtain an approximately 0.5-molar solution. To this solution is added 370 mg poly(ethyl glyoxylate) with a molecular weight of about 40,000 Da, dissolved in 5 ml gamma-butyrolactone, whereby an ink ready for printing and having a viscosity of about 6 mPa is obtained.

This ink was used for a printing test analogous to Example 1, wherein it could be observed that the print was uniform, 98% of the metal ions had been transformed into the metallic state, and the formed printing pattern had a specific resistance of about $10^{-7}$ Ωm.

EXAMPLE 6

Preparation of a Palladium Ink Formulation 500 mg palladium(II) acetate, $Pd(CH_3COO)_2$, is directly dissolved in 4 ml gamma-butyrolactone under stirring without requiring an extraction from an aqueous solution, in order to obtain an 0.55-molar solution. To this solution is added 227 mg poly(ethyl glyoxylate) with a molecular weight of about 40,000 Da, dissolved in 1 ml gamma-butyrolactone, whereby an ink ready for printing and having a viscosity of about 7 mPa is obtained.

This ink was used for a printing test analogous to Example 1, wherein it could be observed that the print was uniform, 98% of the metal ions had been transformed into the metallic state.

Table with further Examples:

| No. | Metal precursor material | Phase transfer reagent | Polymer | Solvent |
|---|---|---|---|---|
| 1 | HAuCl$_4$ | TOAB | PPA | GBL |
| 2 | HAuCl$_4$ | TOAB | PEG | GBL |
| 3 | HAuCl$_4$ | TOAB | PPA | DMSO |
| 4 | HAuCl$_4$ | TOAB | PEG | DMSO |
| 5 | HAuCl$_4$ | TOAB | PMG | GBL |
| 6 | HAuCl4 | TOAB | PEG | DMB |
| 7 | Au(CH$_3$COO)$_3$ | — | PPA | GBL |
| 8 | Au(CH$_3$COO)$_3$ | — | PEG | GBL |
| 9 | Au(CH$_3$COO)$_3$ | — | PMG | GBL |
| 10 | Au(CH$_3$COO)$_3$ | — | PEG | DMSO |
| 11 | Au(CH$_3$COO)$_3$ | — | PPA | DMSO |
| 12 | AgNO$_3$ | — | PPA | DMSO |
| 13 | AgNO$_3$ | — | PEG | DMSO |
| 14 | AgNO$_3$ | — | PMG | DMSO |
| 15 | Ag(C$_8$H$_{17}$COO) | — | PEG | GBL |
| 16 | K$_2$PdCl$_4$ | TOAB | PPA | GBL |
| 17 | K$_2$PdCl$_4$ | TOAB | PEG | GBL |
| 18 | K$_2$PdCl$_4$ | TOAB | PMG | GBL |
| 19 | Pd(CH$_3$COO)$_2$ | — | PPA | GBL |
| 20 | Pd(CH$_3$COO)$_2$ | — | PEG | GBL |
| 21 | Pd(CH$_3$COO)$_2$ | — | PMG | GBL |
| 22 | Pd(CH$_3$COO)$_2$ | — | PPA | DMSO |
| 23 | Pd(CH$_3$COO)$_2$ | — | PEG | Anisol |
| 24 | H$_2$PtCl$_6$ | TOAB | PPA | GBL |
| 25 | H$_2$PtCl$_6$ | TOAB | PEG | GBL |
| 26 | H$_2$PtCl$_6$ | TOAB | PMG | GBL |
| 27 | H$_2$PtCl$_6$ | TOAB | PPA | DMSO |
| 28 | H$_2$PtCl$_6$ | TOAB | PEG | DMSO |
| 29 | H$_2$PtCl$_6$ | TOAB | PMG | DMSO |
| 30 | K$_2$PtCl$_4$ | TOAB | PPA | GBL |
| 31 | K$_2$PtCl$_4$ | TOAB | PEG | GBL |
| 32 | K$_2$PtCl$_4$ | TOAB | PMG | GBL |
| 33 | K$_2$PtCl$_4$ | TOAB | PPA | DMSO |
| 34 | K$_2$PtCl$_4$ | TOAB | PEG | DMSO |
| 35 | K$_2$PtCl$_4$ | TOAB | PMG | DMSO |
| 36 | K$_2$PtCl$_4$ | TOAB | PEG | DMB |
| 37 | Pt(CH$_3$COO)$_2$ | — | PEG | Anisol |
| 38 | Pt(CH$_3$COO)$_2$ | — | PEG | GBL |
| 39 | Pt(CH$_3$COO)$_2$ | — | PEG | GBL |

TOAB . . . tetraoctylammonium bromide
PPA . . . poly(phthalaldehyde)
PEG . . . poly(ethyl glyoxylate)
PMG . . . poly(methyl glyoxylate)
GBL . . . gamma-butyrolactone
DMSO . . . dimethylsulfoxide
DMB . . . 1,2-dimethoxybenzene

The invention claimed is:

1. A metallic conductive ink for ink-jet printing, comprising a metal precursor material and a thermally decomposable polymer dissolved in an organic solvent, characterized in that a polymer having a decomposition temperature $T_c<150°$ C. is contained as the thermally decomposable polymer, the polymer is selected from a cyclic polyacetal having blocked terminal groups, a cyclic polyaldehyde comprising bifunctional monomers selected from the group consisting of polyphthalaldehyde, polyglutaraldehyde, poly-succinaldehyde, or a polymeric glyoxylic acid, or a glyoxylic acid derivative, and monomeric depolymerization products of the thermally decomposable polymer are used as reductants for the metal precursor material.

2. The metallic conductive ink according to claim 1, characterized in that the terminal groups are blocked by stable groups selected from the group consisting of ethers, esters, amides or urethanes.

3. The metallic conductive ink according to claim 1, characterized in that the metal precursor material is a metal complex, or a metal salt, whose central metal atom is selected from the group consisting of Ag, Au, Cu, Zn, Ni, Co, Pd, Pt, Ti, Zr, Cr, Ru, Os, Ir, Sn, Pb, Al, Mo, W, and comprises one or more ligand(s) or counterion(s) selected from the group consisting of H, OH, halogen, ammonium, alkyl ammonium, amine, amide, carboxylate, carbonate, acetyl acetonate, cyanide, cyanate, isocyanate, thiocyanate, isothiocyanate, phosphate, phosphine, alkoxide, alcohol, thiolate, thiol, nitrate, nitrite, azide, terafluoroborate, chlorate, perchlorate and carbonyl.

4. The metallically conductive ink according to claim 1, characterized in that a phase transfer reagent is additionally contained, which is selected from the group of R—NH$_2$, wherein R is either an aromatic hydrocarbon or an alkyl having 4 to 20 carbon atoms, R$_4$N$^+$A, wherein R represents hydrogen, alkyl having 1 to 20 carbon atoms or aromatic hydrocarbons and A$^-$ is halogen, OH or OAc, R—COO$^-$Kat$^+$, wherein R is either an aromatic hydrocarbon or an alkyl having 4 to 20 carbon atoms and Kat$^+$ represents H, NH$_4$, NR$_4$, K, Na or Li, R—SO$_3^-$Kat$^+$, wherein R is either an aromatic hydrocarbon or an alkyl having 4 to 20 carbon atoms and Kat$^+$ represents H, NH$_4$, NR$_4$, K, Na or Li, and R$_3$PO, wherein R is an alkyl having 4 to 20 carbon atoms.

5. The metallically conductive ink according to claim 1, characterized in that at least one solvent selected from the group consisting of dimethyl sulfoxide, gamma-butyrolactone 1,2-dimethoxybenzene, tetrahydrofuran, dioxane, cyclopentanone, alkyl acetate, alkyl propionate, alkyl butyrate, toluene, xylene, butanone, anisole or dichloromethane is contained.

6. The metallically conductive ink according to claim 1, characterized in that the ink has a viscosity of 2.5 to 12 mPa.

7. The metallically conductive ink according to claim 1, characterized in that the ink comprises a metal portion larger than 5% by weight.

8. The metallically conductive ink according to claim 1, characterized in that it contains surfactants selected from the group consisting of, block copolymers, wetting agents or emulsifiers.

9. The metallic conductive ink according to claim 1, characterized in that metallic nanoparticles having dimensions of 3 to 200 nm are additionally contained.

10. The metallically conductive ink according to claim 1, characterized in that 5 to 10% by weight, of the metal portion of the ink is comprised of metallic nanoparticles.

11. The metallic conductive ink according to claim 1, wherein the thermally decomposable polymer is poly(methlglyoxylate).

12. The metallic conductive ink according to claim 3, wherein the metal precursor material is H$_2$PtCl$_6$, K$_2$PtCl$_4$, Pt(acac)$_2$, PtCl$_2$, PtCl$_4$, (NH$_4$)$_2$PdCl$_4$, (NH$_4$)$_2$PdCl$_6$, Pd(acac)$_2$, Pd(C$_n$H$_{2n+}$COO)$_2$ (n-1-20), HAuCl$_4$, (NH$_4$)AuCl$_4$, Au(C$_n$H$_{2n-1}$COO)$_2$ (n-1-20), Ag(CH$_3$(CH$_2$)$_n$COO) wherein n=4-25, AgNO$_3$, CuSO$_4$, RuCl$_3$, Ru(acac)$_3$, SnCl$_2$, ZnCl$_2$ or Zn(NO$_3$)$_2$.

13. The metallic conductive ink according to claim 1, wherein the metal precursor material is an organometallic decomposition compound.

14. A method for producing a metallically conductive ink for ink-jet printing, comprising dissolving a metal precursor material and adding a thermally decomposable polymer dissolved in an organic solvent, characterized in that a solution of the metal precursor material is supplemented with a thermally decomposable polymer dissolved in an organic solvent and having a decomposition temperature $T_c$<150° C., which polymer is selected from a cyclic polyacetal having blocked terminal groups, a cyclic polyaldehyde comprising bifunctional monomers selected from the group consisting of polyphthalaldehyde, polyglutaraldehyde, poly-succinaldehyde, and a polymeric glyoxylic acid, or a glyoxylic acid derivative, and that the metal precursor material is reduced by monomeric depolymerization products of the thermally decomposable polymer.

15. The method according to claim 14, characterized in that an aqueous solution of the metal precursor material is supplemented with a phase transfer reagent dissolved in an organic solvent, is stirred, and a formed organic phase, after having been separated from the aqueous phase, is added to the solution of the decomposable polymer.

16. The method according to claim 14, characterized in that the formed organic phase containing the metal precursor material is evaporated and a residue containing the metal precursor material is taken up in an organic solvent.

17. The method according to claim 14, characterized in that as the metal precursor material a metal complex or a metal salt is used, whose central metal atom is selected from the group consisting of Ag, Au, Cu, Zn, Ni, Co, Pd, Pt, Ti, Zr, Cr, Ru, Os, Ir, Sn, Pb, Al, Mo, W, and comprises one or more ligand(s) or counterion(s) selected from the group consisting of H, OH, halogen, ammonium, alkyl ammonium, amine, amide, carboxylate, carbonate, acetyl acetonate, cyanide, cyanate, isocyanate, thiocyanate, isothiocyanate, phosphate, phosphine, alkoxide, alcohol, thiolate, thiol, nitrate, nitrite, azide, terafluoroborate, chlorate, perchlorate and carbonyl.

18. The method according to claim 14, characterized in that the phase transfer reagent is selected from the group of R—$NH_2$, wherein R is either an aromatic hydrocarbon or an alkyl having 4 to 20 carbon atoms, $R_4N^+A^-$, wherein R represents hydrogen, alkyl having 1 to 20 carbon atoms or aromatic hydrocarbons and $A^-$ is halogen, OH or OAc, R—$COO^-Kat^+$, wherein R is either an aromatic hydrocarbon or an alkyl having 4 to 20 carbon atoms and $Kat^+$ represents H, $NH_4$, $NR_4$, K, Na or Li, R—$SO_3^-Kat^+$, wherein R is either an aromatic hydrocarbon or an alkyl having 4 to 20 carbon atoms and $Kat^+$ represents H, $NH_4$, $NR_4$, K, Na or Li, and $R_3PO$, wherein R is an alkyl having 4 to 20 carbon atoms.

19. The method according to claim 14, wherein the thermally decomposable polymer is poly(methyl glyoxylate).

20. The method according to claim 17, wherein the metal precursor material is $H_2PtCl_6$, $K_2PtCl_4$, $Pt(acac)_2$, $PtCl_2$, $PtCl_4$, $(NH_4)_2PdCl_4$, $(NH_4)_2PdCl_6$, $Pd(acac)_2$, $Pd(C_nH_{2n+1}COO)_2$ (n-1-20), $HAuCl_4$, $(NH_4)AuCl_4$, $Au(C_nH_{2n-1}COO)_2$ (n-1-20), $Ag(CH_3(CH_2)_nCOO)$ wherein n=4-25, $AgNO_3$, $CuSO_4$, $RuCl_3$, $Ru(acac)_3$, $SnCl_2$, $ZnCl_2$ or $Zn(NO_3)_2$.

* * * * *